United States Patent [19]

Morikawa et al.

[11] Patent Number: 5,118,274

[45] Date of Patent: Jun. 2, 1992

[54] APPARATUS FOR STRETCHING DOUGH

[75] Inventors: Michio Morikawa; Torahiko Hayashi, both of Utsunomiya, Japan

[73] Assignee: Rheon Automatic Machinery Co., Ltd., Utsunomiya, Japan

[21] Appl. No.: 628,777

[22] Filed: Dec. 17, 1990

[30] Foreign Application Priority Data

Jan. 16, 1990 [JP] Japan ................................ 2-6877

[51] Int. Cl.$^5$ .................................................. A21C 3/00
[52] U.S. Cl. .................................. 425/140; 264/40.7; 425/145; 425/373
[58] Field of Search ............... 425/140, 141, 145, 373, 425/DIG. 108; 264/40.7; 426/231

[56] References Cited

U.S. PATENT DOCUMENTS

| | | | |
|---|---|---|---|
| 4,398,877 | 8/1983 | Taylor | 425/145 |
| 4,631,021 | 12/1986 | Hayashi | 425/140 |
| 4,692,107 | 9/1987 | Morikawa et al. | 425/140 |
| 4,692,110 | 9/1987 | Hayashi | 425/373 |

Primary Examiner—George Yeung
Attorney, Agent, or Firm—Guy W. Shoup; David W. Heid

[57] ABSTRACT

A method for producing a dough sheet having a predetermined width and height from a dough mass of a non-uniform volume, comprising the steps of compressing the mass on a supplying conveyor, detecting any change of width of the compressed dough sheet, driving a delivery conveyor provided downstream of the supplying conveyor at a constant speed, while changing the speed of the supplying conveyor, and, further, stretching the dough sheet on the delivery conveyor, the supplying conveyor being driven based on the data of any detected change in the dough width. Apparatuses are provided to carry out the above method.

4 Claims, 7 Drawing Sheets

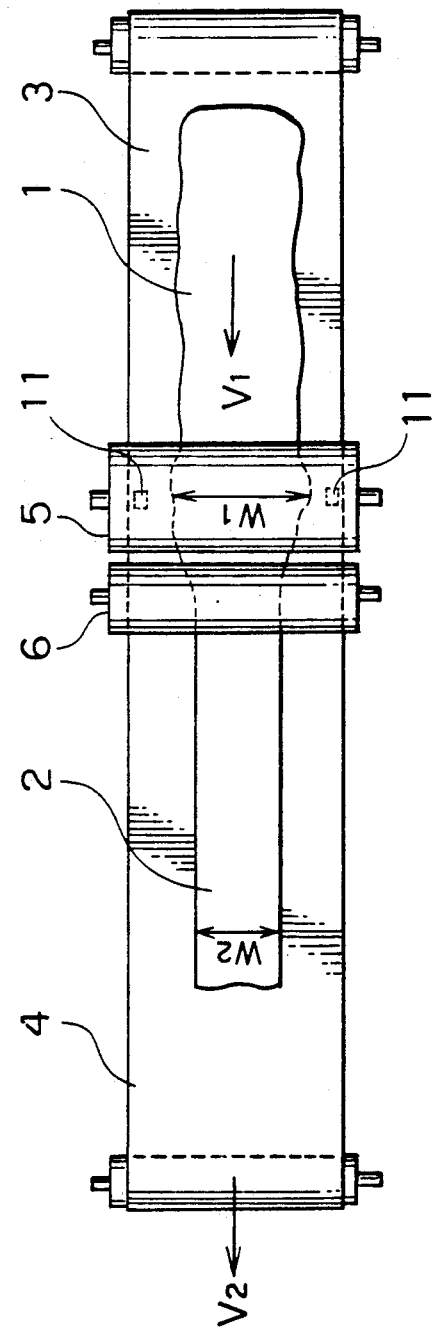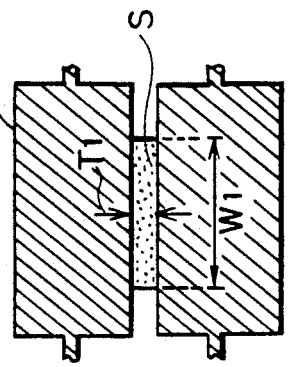
FIG. 2
FIG. 3

APPARATUS FOR STRETCHING DOUGH

BACKGROUND OF THE INVENTION

1. Field of Invention

This invention relates to a method and apparatus for stretching plastic material, and, more particularly, to a method and apparatus for stretching dough for bread or confectionery.

2. Description of Prior Art

The prior art related to the stretching of dough of this invention is disclosed in U.S. Pat. Nos. 4,692,110 and 4,631,021, both of which issued to the assignee of this applicant.

U.S. Pat. No. 4,692,110 discloses a dough-stretching apparatus whose object is to stretch a mass of supplied dough into a sheet of dough having a predetermined thickness. However, this apparatus is neither capable of making the width of the stretched sheet of dough uniform, nor of producing the stretched sheet of dough at a constant production speed.

U.S. Pat. No. 4,631,021 discloses an apparatus for producing a sheet of dough having predetermined dimensions and delivering it at a predetermined delivery rate to produce a sheet of dough having a uniform shape. However, the proposed means is based on the measurement of the weight of a mass of dough supplied in an indefinite shape before the stretching step.

SUMMARY OF THE INVENTION

This invention provides an automatic dough-stretching apparatus which produces a continuous sheet of dough used for the production of bread and confectionery and in which the manufacturing parameters, including the production speed, width, and thickness of the sheet of dough, are previously stored in a computer memory, so that a mass of dough supplied with a non-uniform width or thickness can be automatically stretched into a sheet of dough that satisfies the conditions stored in the computer memory.

The dough-stretching apparatus of the present invention includes a compressing device located above a dough-supplying conveyor so as to make uniform the height of a mass of dough supplied in an indefinite shape. When the height of the mass of the supplied dough is made uniform, the only variable in the dimensions of the stretched sheet of dough will be its width. Therefore, by merely continuously measuring the width of the sheet of dough passing through a measuring position, the volume of portions of the dough sheet at that position can be continuously or sequentially recorded in the computer memory. Based on the volume data stored in the memory, the speed of the dough-supplying conveyor is suitably and continuously changed so that the amount of the sheet of dough transferred per unit time from the dough-supplying conveyor onto a delivery conveyor is made uniform.

Therefore, it is an object of the present invention to provide a dough-stretching method for continuously compressing a supplied mass of a non-uniform volume of dough into a dough sheet of a uniform volume, comprising the steps of:

conveying the supplied mass of the non-uniform volume of dough on a supplying conveyor to a delivery conveyor located downstream of the supplying conveyor, compressing the mass of dough on the supplying conveyor into a dough sheet having a uniform thickness, detecting the dough width at the point where the dough is compressed, setting the speed of the supplying conveyor relative to the speed of the delivery conveyor, based on the detected value of the dough width, and further stretching the dough on the delivery conveyor.

Another object of the present invention is to provide a dough-stretching apparatus comprising:

a dough-supplying conveyor for conveying a continuous sheet of dough and a constant-speed delivery conveyor positioned in series with and downstream of the supplying conveyor, a roller for applying pressure to the dough, disposed at the downstream end of the supplying conveyor, a dough-width measuring device located near the pressure-applying roller, and the dough-width measuring device being arranged so as to measure the width of the dough when it is compressed by the pressure-applying roller and to change the speed of the supplying conveyor in a relation inversely proportional to the value of the dough width before it is supplied onto the delivery conveyor, thereby to produce at a constant speed a dough sheet of a uniform width and thickness.

A further object of the present invention is to provide a dough-stretching apparatus comprising:

a dough-supplying conveyor for conveying a continuous sheet of dough and a constant-speed delivery conveyor positioned in series with and downstream of the supplying conveyor, one or a plurality of rollers located above and adjacent the area between the downstream end of the supplying conveyor and the upstream end of the delivery conveyor, the roller or rollers reciprocating over a predetermined range while rolling along the moving path of the two conveyors, and a dough-width measuring device located adjacent the downstream end of the supplying conveyor, the speed of the supplying conveyor being changed based on the measured value of the measuring device, while the speed of the delivery conveyor is kept constant.

A further object of the present invention is to provide a dough-stretching apparatus comprising:

a dough-sheet supplying conveyor with a variable speed to supply a continuous sheet of dough and a delivery conveyor with a constant speed positioned in series with and downstream of the supplying conveyor, a plurality of freely rotatable rollers spaced apart from each other and from the conveyors and above the area between the downstream end of the supplying conveyor and the upstream end of the delivery conveyor, the rollers orbiting above said area, the dough being supplied into the space between the rollers and the upper surface of the supplying conveyor and causing the rollers to rotate by friction with the dough sheet, and a dough-width measuring device located at the downstream end of the supplying conveyor to measure the dough width and to set the speed of the supplying conveyor in a relation inversely proportional to the measured value.

BRIEF DESCRIPTION OF THE DRAWINGS

FIG. 2 is a top plan view of the embodiment shown in FIG. 1;

FIG. 3 shows a schematic cross section of the apparatus taken along the line 3—3 in FIG. 1;

PREFERRED EMBODIMENTS OF THE INVENTION

Working Examples

Preferred embodiments of the present invention will now be described by reference to the attached drawings.

A mass of dough 1 with an indefinite shape is placed on a dough-supplying conveyor 3. Downstream of the supplying conveyor 3 is positioned a delivery conveyor 4. A dough-compressing means in the form of a dough feed roller 5 is positioned at the downstream end of and above the supplying conveyor 3, spaced apart from the conveying path of the supplying conveyor 3 by a predetermined distance, $T_1$.

Figure 1:
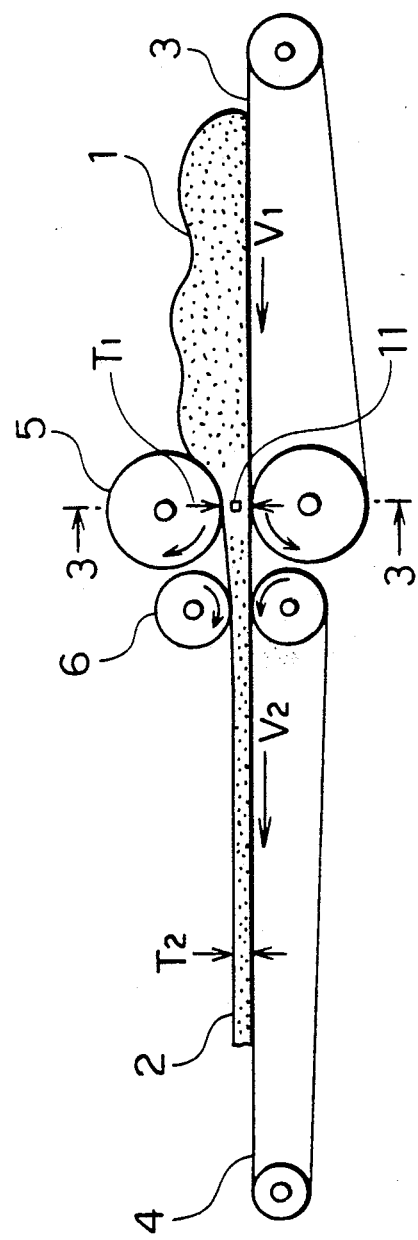
FIG. 1 is a schematic side elevational view of a first embodiment of the apparatus of the present invention.

In FIG. 1, two distance sensors 11 are disposed, one on each side of the conveying path of the conveyor 3 and near the roller 5 (width-measuring) position. The distance sensors 11 sense the distance between the respective sides of the mass of dough 1, and send signals representing the distance to the computer 12 (FIG. 7) which computes the width $W_1$ (FIG. 2) of the mass of dough 1.

The dough-feed roller 5 compresses and makes the height of the dough 1 uniform. The sectional area S (FIG. 3) of the mass of dough 1 at the width-measuring position is given by the formula $S = W_1 \times T_1$, wherein $T_1$ is the height of the dough under the roller 5.

The computer 12 thus computes the sectional area S of the mass of the dough 1 at the width-measuring position according to the equation $W_1 \times T_1 = S$. Then, on the basis of the computed value of the sectional area S, the computer 12 computes the desired speed $V_1$ for the dough-supplying conveyor 3 and sends signals to the servomotor 13 (FIG. 7) to control its rotation. The servomotor 13 thus adjusts the speed $V_1$ of the conveyor 3.

A compressing means such as, for example, the shaping roller 6, is located above the delivery conveyor 4. The roller 6 reduces the thickness of the dough to $T_2$. The data representing the desired width $W_2$ (FIG. 2) and thickness $T_2$ of the dough sheet 2 to be produced are stored, together with the data representing the desired production speed $V_2$, in the memory of the computer 12. The dough-stretching operation is carried out while the speed of the delivery conveyor 4 is maintained at the value $V_2$. The computer 12 continuously controls the speed $V_1$ of the dough-supplying conveyor 3 so as to satisfy the following relation:

$$T_2 \times W_2 \times V_2 = T_1 \times W_1 \times V_1$$

Due to the speed difference between the dough-supplying conveyor 3 and the delivery conveyor 4, a dough sheet 2 having the desired thickness $T_2$ and the desired width $W_2$ can be produced.

Figure 4:
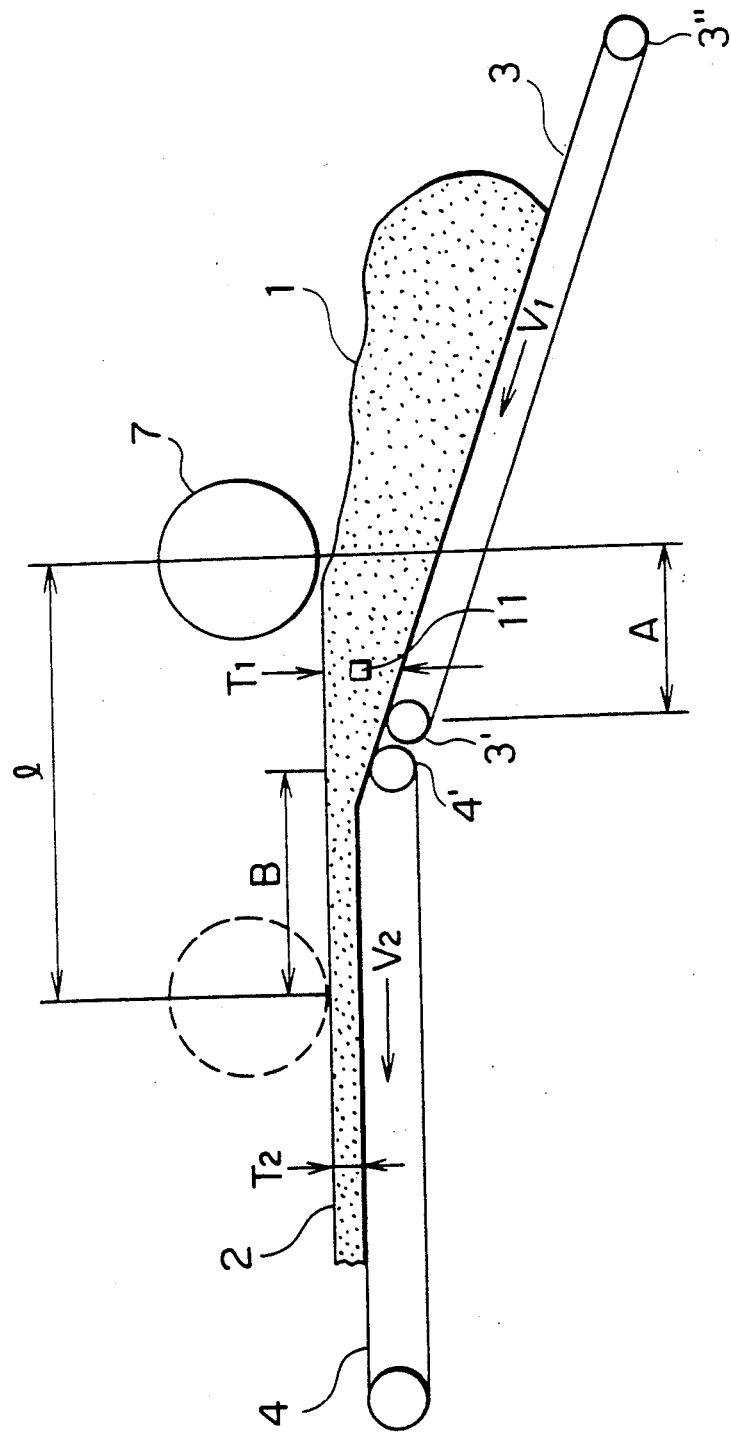
FIG. 4 is a schematic side elevational view of a second embodiment of the apparatus of the present invention.

The apparatus of the second embodiment of the present invention, shown in FIG. 4, features a single roller. That is, the reciprocating roller 7 acts as both the compressing means to make the height of the mass of dough 1 uniform so that it has the value $T_1$ and the means for determining the thickness $T_2$ of the stretched sheet of dough 2 of the first embodiment. The reciprocating roller 7 repeats its reciprocating movement while rolling over an illustrated range l. The range l includes a range A between the upstream operating limit of the roller 7 and the downstream end 3′ of the dough-supplying conveyor 3, and a range B between the downstream operating limit of the roller 7 and the upstream end 4′ of the delivery conveyor 4. Thus the roller flattens the upper surface of the mass of dough 1 having the indefinite shape, determines the dough thickness $T_1$ at a width-measuring position on the dough-supplying conveyor 3, and determines the dough thickness $T_2$ on the delivery conveyor 4.

In FIG. 4, the position of the downstream end 3′ of the dough-supplying conveyor 3 is selected to be higher than the upstream end 3″ of the conveyor 3. The purpose of this structure is to greatly enhance the effect of compressing and shaping the dough by the operation of the roller 7 that reciprocates while it rolls. Namely, since the dough-supplying conveyor is inclined relative to the delivery conveyor, the mass of dough can smoothly enter the space between the roller 7 and the conveyor 3, and the dough can be easily and effectively flattened.

The distance sensors 11 sense the width $W_1$ of the mass of dough 1.

The sectional area S of the mass of dough 1 at the width-measuring position can be expressed as $S = T_1 \times W_1$. Further, the controlled speed $V_1$ of the dough-supplying conveyor 3 relative to the constant speed $V_2$ of the delivery conveyor 4 is calculated according to the following equation:

$$T_2 \times W_2 \times V_2 = T_1 \times W_1 \times V_1$$

where $T_1$ is a constant, $W_1$ is a variable, and $V_1$ is a variable determined by the value of $(T_1 \times W_1)$.

Based on the above equation, the computer 12 controls the rotating speed of the servomotor 13 (FIG. 7) to attain the desired control.

Figure 5:
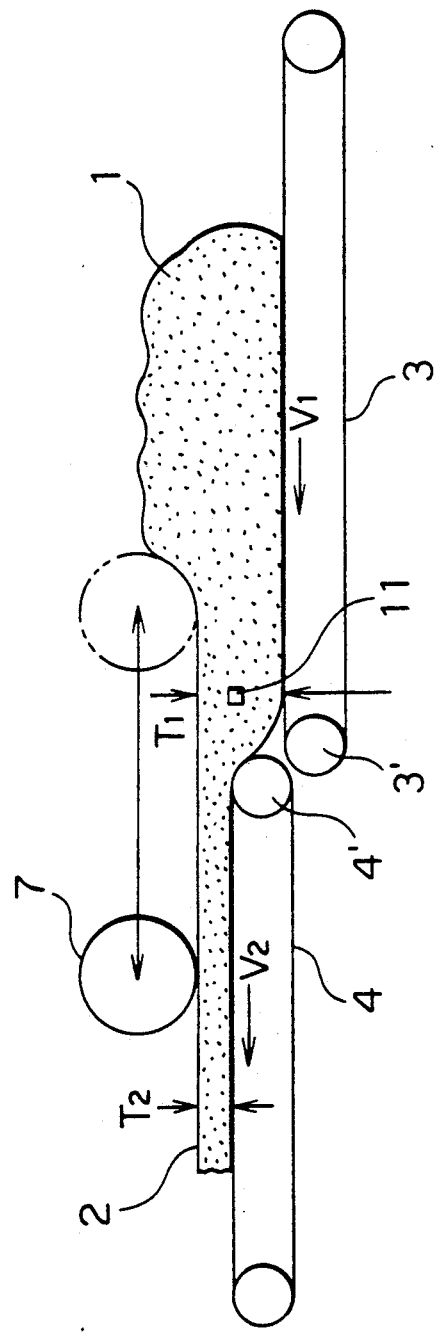
FIG. 5 is a schematic side elevational view of a third embodiment of the apparatus of the present invention.
Figure 6:
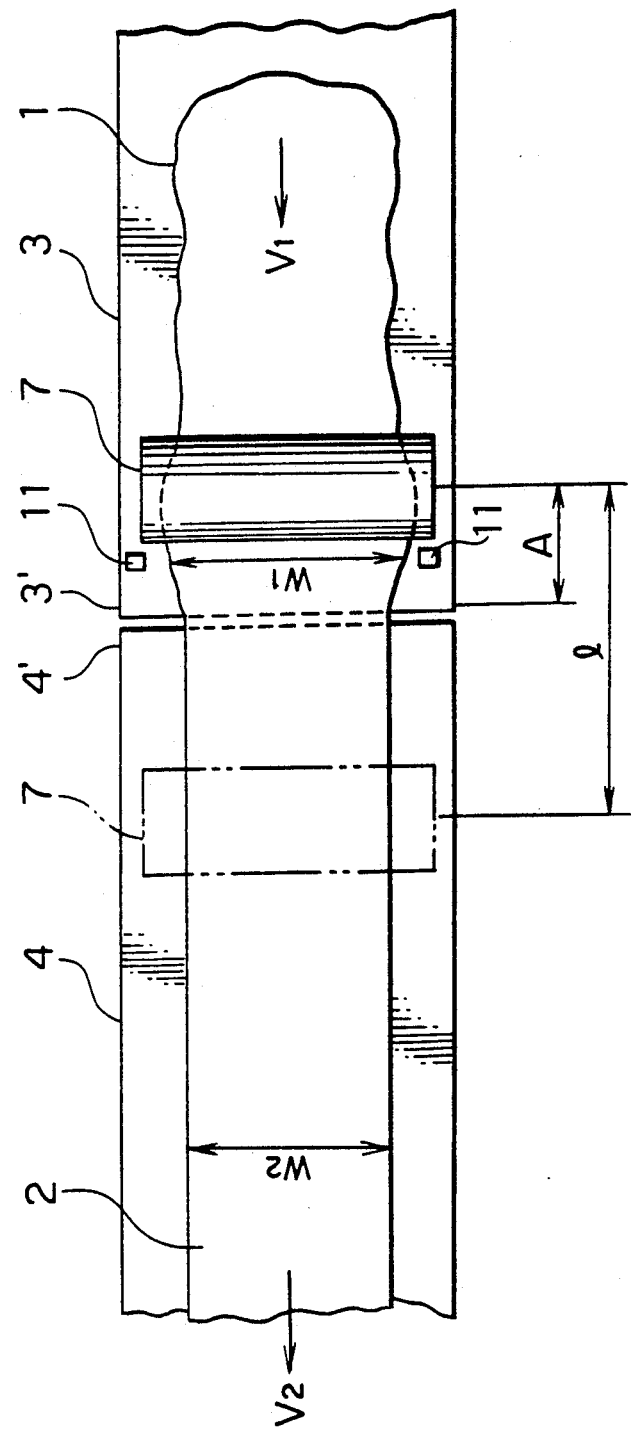
FIG. 6 is a schematic top plan view of those apparatuses shown in FIGS. 4 and 5.

A third embodiment of the present invention is shown in FIGS. 5 and 6. The apparatus shown in FIGS. 5 and 6 is a modification of that shown in FIG. 4 in that the dough-supplying conveyor 3 is disposed in the horizontal direction at a level lower than the level of the delivery conveyor 4.

Figure 7:
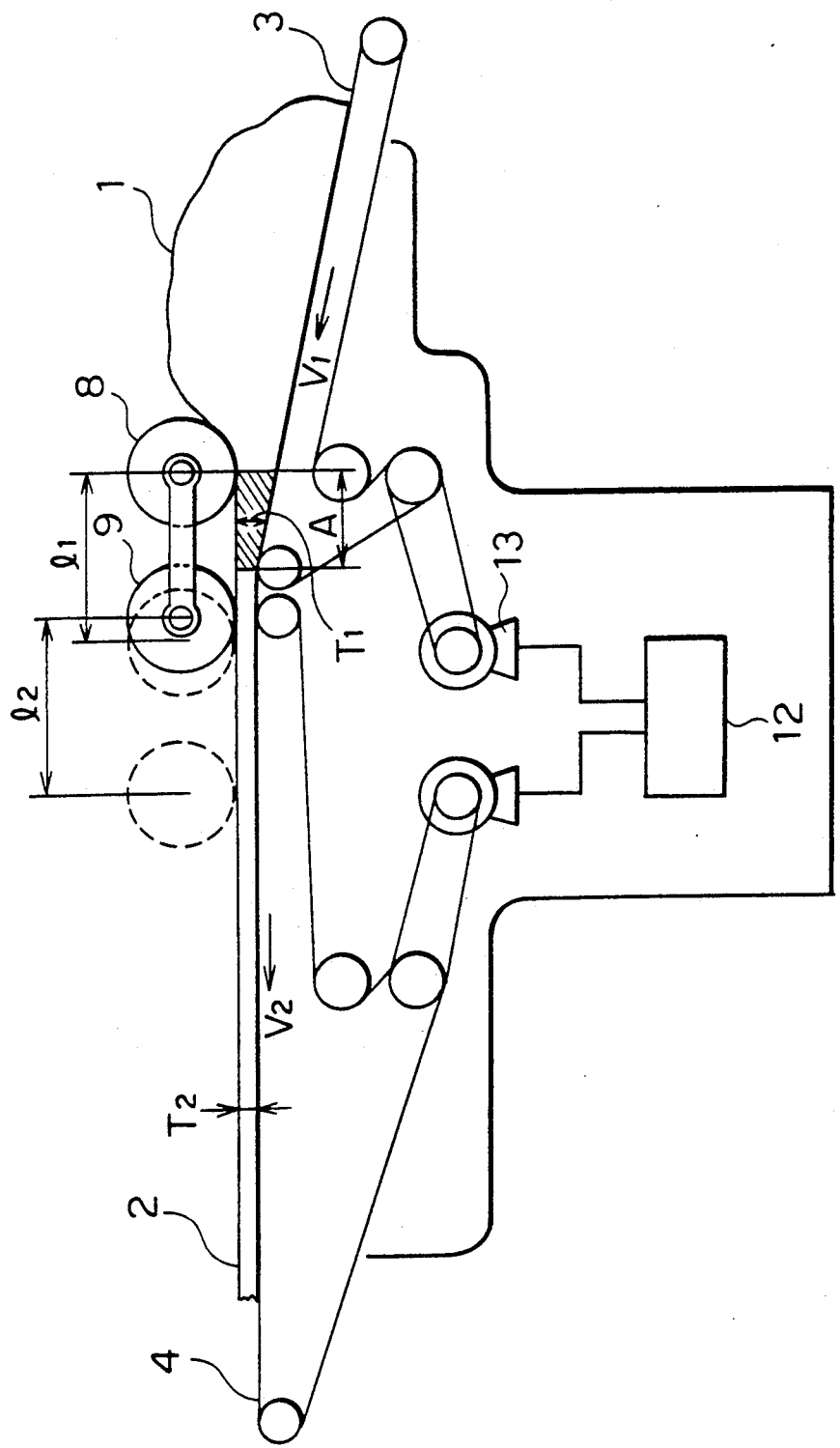
FIG. 7 is a schematic side elevational view of a fourth embodiment of the apparatus of the present invention.

In the fourth embodiment of the present invention, shown in FIG. 7, the apparatus has two linked reciprocating rollers 8 and 9 that are arranged so that the reciprocating roller 8 substantially reciprocates over a range $l_1$ above the dough-supplying conveyor 3 and a part of the delivery conveyor 4, while the reciprocating roller reciprocates over a range $l_2$ above the delivery conveyor 4. By this arrangement, the reciprocating roller 9 rotates so that its peripheral speed is equivalent to the speed $V_2$ of the delivery conveyor, while the roller 8 rotates so that its peripheral speed is equivalent to the speed $V_1$ of the dough-supplying conveyor 3.

Figure 9:
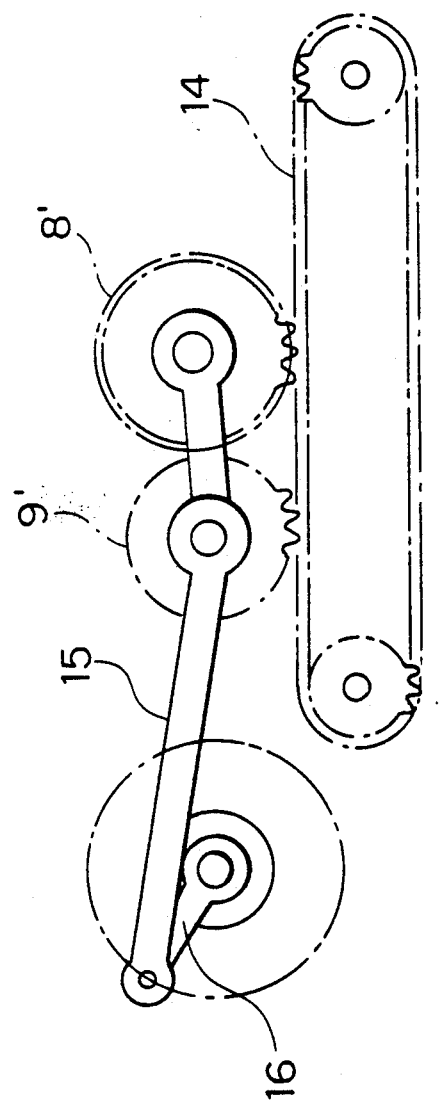
FIG. 9 schematically illustrates a rotation input mechanism that actuates the reciprocating rollers shown in FIG. 7.

FIG. 9 shows a rotation input mechanism for the reciprocating rollers 8 and 9. A chain 14 is arranged to be driven in the same direction and at the same speed as is the delivery conveyor 4. A sprocket 9' meshing with this chain 14 is mounted on one end of the shaft of the roller 9.

A crank 16 and a rod 15 act to cause a reciprocating movement of the sprocket 9' engaging the chain 14, so that the roller 9 reciprocates over the range $l_2$ while rolling. Another sprocket 8' is mounted on one end of the shaft of the reciprocating roller 8 and also engages the chain 14, so that the roller 8 similarly reciprocates over the range $l_1$ while rolling. In this case, the diameter of the sprocket 8' is selected to be larger than that of the sprocket 9', so that the peripheral speed of the sprocket 8' is lower than that of the sprocket 9'. Therefore, when the rollers 8 and 9 have the same diameter, the roller 8 rolls so that its peripheral speed becomes the same as the speed of the mass of dough 1 being conveyed by the dough-supplying conveyor 3, whose speed $V_1$ is lower than the speed $V_2$ of the delivery conveyor 4.

Figure 8:
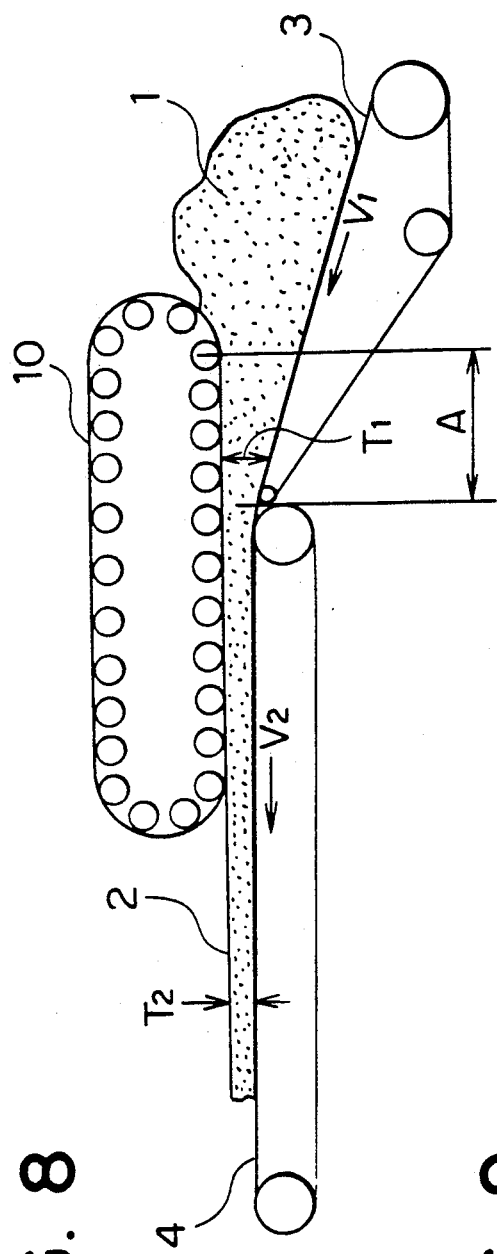
FIG. 8 is a schematic side elevational view of a fifth embodiment of the apparatus of the present invention.

In the apparatus according to the fifth embodiment shown in FIG. 8, the number 10 designates the group of many rollers revolving along a predetermined orbit while rotating. The path of orbital motion is rectilinear in its lower part. The roller group 10 stretches the mass of dough 1 in the range covering the downstream end of the dough-supplying conveyor 3 and the upstream end of the delivery conveyor 4. Thus, a stretching effect similar to that already described is exhibited so as to attain the object of the present invention.

As was the case with the second embodiment, the dough is effectively compressed and shaped in the fourth and the fifth embodiments, since the dough-supplying conveyor 3 is inclined upwardly toward the delivery conveyor 4.

It will be understood from the foregoing description of the present invention that a mass of dough supplied in an indefinite shape can be stretched into a sheet of dough having a constant volume by making uniform the height of the mass of dough on a dough-supplying conveyor, by detecting a change in the dough width resulting from making the height of the dough uniform, by computing a corresponding speed difference between the dough-supplying conveyor and a delivery conveyor disposed on the downstream side of the supply conveyor and driven at a constant speed, and by driving the dough-supplying roller at the speed corresponding to the computed speed difference.

Thus, the present invention solves the prior art defects and can produce a sheet of dough having a high quality, and can do so with a high accuracy.

We claim:

1. A dough-stretching apparatus comprising:
   a dough-supplying conveyor for conveying a continuous sheet of dough and a constant-speed delivery conveyor positioned in series with and downstream of the supplying conveyor,
   a roller for applying pressure to the dough, disposed at the downstream end of the supplying conveyor,
   a dough-width measuring device located near the pressure-applying roller and for producing a signal representing a dough width, and
   means for changing the speed of the supplying conveyor in response to the signal produced by the dough-width measuring device, such that the speed of the supplying conveyor is changed in a relation inversely proportional to the dough width before the dough is supplied onto the delivery conveyor.

2. The dough-stretching apparatus of claim 1 further comprising a second roller, disposed above the delivery conveyor, to adjust the thickness of the dough sheet to be produced.

3. A dough-stretching apparatus comprising:
   a dough-supplying conveyor for conveying a continuous sheet of dough and a constant-speed delivery conveyor positioned in series with and downstream of the supplying conveyor,
   one or a plurality of rollers located above and adjacent the area between the downstream end of the supplying conveyor and the upstream end of the delivery conveyor, the roller or rollers reicprocating over a predetermined range while rolling along the moving path of the two conveyors, and
   a dough-width measuring device located adjacent the downstream end of the supplying conveyor and for producing a signal representing a dough width, and
   means for changing the speed of the supplying conveyor in response to the signal produced by the dough-width measuring device, while the speed of the delivery conveyor is kept constant.

4. A dough-stretching apparatus comprising:
   a dough sheet supplying conveyor with a variable speed to supply a continuous sheet of dough and a delivery conveyor with a constant speed positioned in series with and downstream of the supplying conveyor,
   a plurality of freely rotatable rollers spaced apart from each other and from the conveyors and above the area between the downstream end of the supplying conveyor and the upstream end of the delivery conveyor, the rollers orbiting above said area, the dough being supplied into the space between the rollers and the upper surface of the supplying conveyor and causing the rollers to rotate by friction with the dough sheet, and
   a dough-width measuring device located at the downstream end of the supplying conveyor to measure the dough width and to produce a signal representing the measured dough width, and
   means for changing the speed of the supplying conveyor in a relation inversely proportional to the signal produced by the dough-width measuring device.

* * * * *